(12) United States Patent
Seong

(10) Patent No.: US 9,768,418 B2
(45) Date of Patent: Sep. 19, 2017

(54) BATTERY PACK

(71) Applicant: SAMSUNG SDI CO., LTD., Yongin-si, Gyeonggi-do (KR)

(72) Inventor: Jae-Il Seong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 125 days.

(21) Appl. No.: 14/530,542

(22) Filed: Oct. 31, 2014

(65) Prior Publication Data
US 2015/0228934 A1 Aug. 13, 2015

(30) Foreign Application Priority Data
Feb. 12, 2014 (KR) .................. 10-2014-0016285

(51) Int. Cl.
H01M 2/02 (2006.01)
H01M 2/04 (2006.01)
H01M 2/22 (2006.01)
H01M 2/30 (2006.01)

(52) U.S. Cl.
CPC ........ *H01M 2/0202* (2013.01); *H01M 2/0404* (2013.01); *H01M 2/22* (2013.01); *H01M 2/30* (2013.01); *H01M 2220/30* (2013.01)

(58) Field of Classification Search
CPC ........................................ H01M 2/02–2/0495
See application file for complete search history.

(56) References Cited

U.S. PATENT DOCUMENTS

| | | | | |
|---|---|---|---|---|
| 6,767,667 B1* | 7/2004 | Ooshima | ............. | H01M 2/0202 429/162 |
| 6,977,124 B2* | 12/2005 | Probst | .................... | A61N 1/375 429/163 |
| 2003/0077505 A1* | 4/2003 | Goda | .................. | H01M 2/0207 429/56 |
| 2005/0181272 A1* | 8/2005 | Kim | .................... | H01M 2/0202 429/56 |
| 2007/0145098 A1* | 6/2007 | Lee | ......................... | H01M 2/02 228/101 |
| 2007/0224501 A1* | 9/2007 | Yoon | ................... | H01M 2/0202 429/176 |

FOREIGN PATENT DOCUMENTS

| | | |
|---|---|---|
| KR | 1999-022813 | 3/1999 |
| KR | 10-2006-0027270 | 3/2006 |
| KR | 10-2007-0096652 | 10/2007 |
| WO | WO 97/38453 | 10/1997 |

* cited by examiner

*Primary Examiner* — Jonathan Crepeau
*Assistant Examiner* — Jacob Buchanan
(74) *Attorney, Agent, or Firm* — Lewis Roca Rothgerber Christie LLP

(57) ABSTRACT

A secondary battery including: a can having an opening at one end; and an electrode assembly in the can, wherein the can includes: a bottom surface which is curved; and a deformation inducing portion at the bottom surface to reduce a force needed for deformation when bending the bottom surface.

15 Claims, 5 Drawing Sheets

BATTERY PACK

CROSS-REFERENCE TO RELATED APPLICATION

This application claims priority to and the benefit of Korean Patent Application No. 10-2014-0016285, filed on Feb. 12, 2014, in the Korean Intellectual Property Office, the disclosure of which is incorporated herein in its entirety by reference.

BACKGROUND

1. Field

One or more embodiments of the present invention relate to a secondary battery.

2. Description of the Related Art

Due to developments in wireless Internet and communication technology, use of mobile electronic appliances that operate using a battery instead of a power supply device has become common. Among these devices, mobile computers are compact and easy to carry, and thus, are widely used for work or personal purposes at fixed locations or when traveling. To this end, mobile computers may include a battery pack as a power supply device. A battery pack may include a plurality of secondary batteries that may be repeatedly charged and discharged in order to provide a sufficient power output.

With the growth in the market of mobile electronic appliances, demand for batteries that are suitable for driving mobile electronic appliances is increasing, and flexibility of the appliances in regard to use, movement, and storage of the mobile electronic appliances and durability thereof against impacts, is also increasing in demand. Accordingly, demand for flexibility of batteries to provide flexibility to the appliances is also increasing.

SUMMARY

One or more embodiments of the present invention include secondary batteries.

Additional aspects will be set forth in part in the description which follows and, in part, will be apparent from the description, or may be learned by practice of the presented embodiments.

According to one or more embodiments of the present invention, a secondary battery includes: a can having an opening at one end; and an electrode assembly in the can, wherein the can includes: a bottom surface which is curved; and a deformation inducing portion at the bottom surface to reduce a force needed for deformation when bending the bottom surface.

The can may include: a first surface attached to the bottom surface, the first surface being convex and connected to the bottom surface; and a second surface attached to the bottom surface, the second surface being concave and facing the first surface.

A distance from the deformation inducing portion to the first surface may be greater than a distance from the deformation inducing portion to the second surface.

The deformation inducing portion may be formed by indenting a portion of the bottom surface.

The deformation inducing groove may be at the bottom surface exposed to the outside of the can.

A depth of the deformation inducing groove may vary along a lengthwise direction of the deformation inducing groove.

A depth of the deformation inducing groove gradually may decrease from a center to two ends of the deformation inducing groove.

A first thickness of a portion of the bottom surface on which the deformation inducing portion is formed may be different from a second thickness of a portion of the bottom surface on which the deformation inducing portion is not formed.

The first thickness may be equal to or greater than 25% of the second thickness.

The deformation inducing portion may be elongated along a lengthwise direction of the bottom surface.

The deformation inducing portion may be symmetrical with respect to a center of the bottom surface.

The deformation inducing portion may be discontinuously formed.

According to one or more embodiments of the present invention, a secondary battery includes: a can that has an opening at one end and is curved; an electrode assembly in the can; a cap plate sealing the opening; and a deformation inducing portion that is an indentation on a bottom surface of the can.

The deformation inducing portion may reduce a force necessary to cause deformation when bending the can.

The deformation inducing portion may be formed by indenting the bottom surface of the can inside the can.

A thickness of the bottom surface on which the deformation inducing portion is formed may be different in a center portion and in other portions of the can.

The deformation inducing portion may be discontinuous.

The deformation inducing portion may be elongated along a lengthwise direction of the bottom surface of the can.

The can may include surfaces attached to the bottom surface to face each other and are either concave or convex, wherein one of the surfaces is concave and the other is convex, wherein the deformation inducing portion is on the bottom surface closer to the concave surface than to the convex surface.

BRIEF DESCRIPTION OF THE DRAWINGS

These and/or other aspects of embodiments of the present invention will become apparent and more readily appreciated from the following description of example embodiments, taken in conjunction with the accompanying drawings in which.

DETAILED DESCRIPTION

Figure 1:
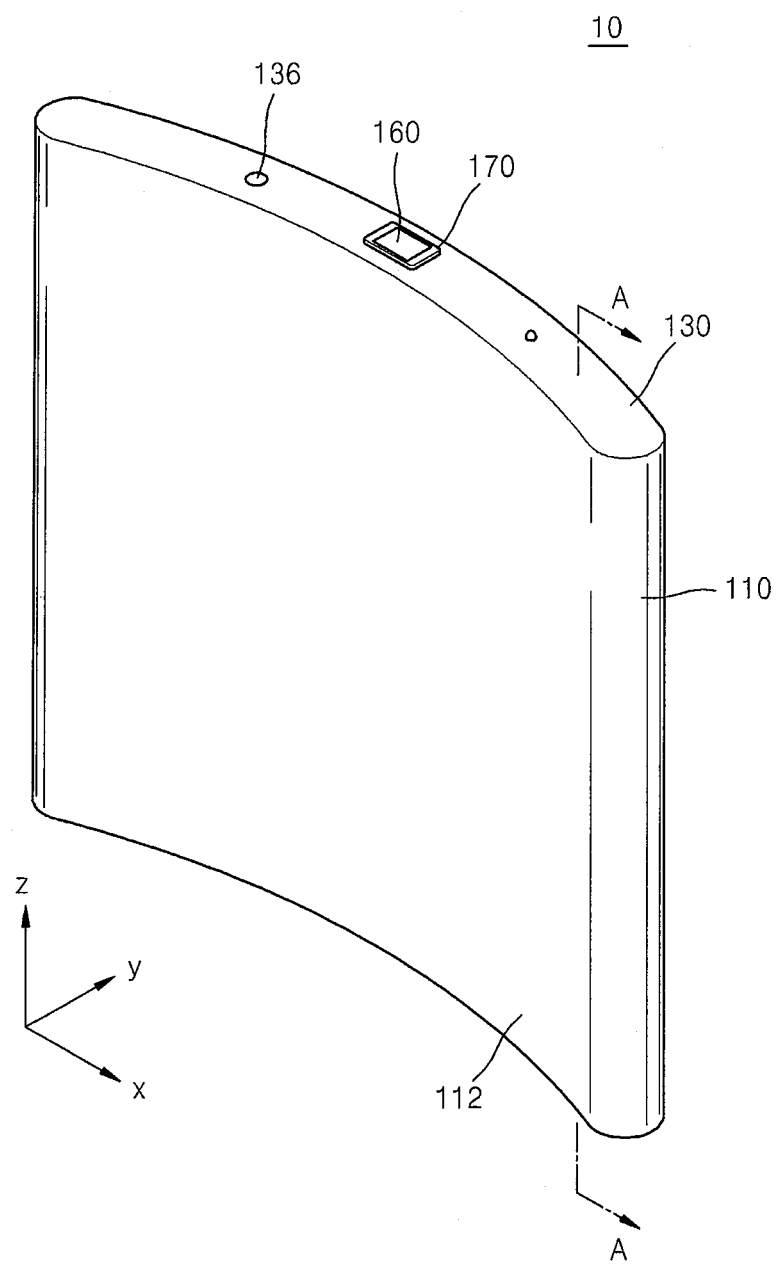
FIG. 1 is a perspective view illustrating a secondary battery according to an embodiment of the present invention.

Reference will now be made in detail to embodiments of the present invention, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Hereinafter, the inventive concept will be described more fully with reference to the accompanying drawings, in which example embodiments of the present invention are shown. However, these embodiments are provided so that this disclosure will be thorough and complete to those of ordinary skill in the art. As the inventive concept allows for various changes and many different forms, particular embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept. When describing embodiments of the invention, like reference numerals denote like elements even when illustrated in difference embodiments.

While such terms as "first," "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Embodiments of the present invention will be described below in more detail with reference to the accompanying drawings, in which example embodiments of the invention are shown.

Figure 2:
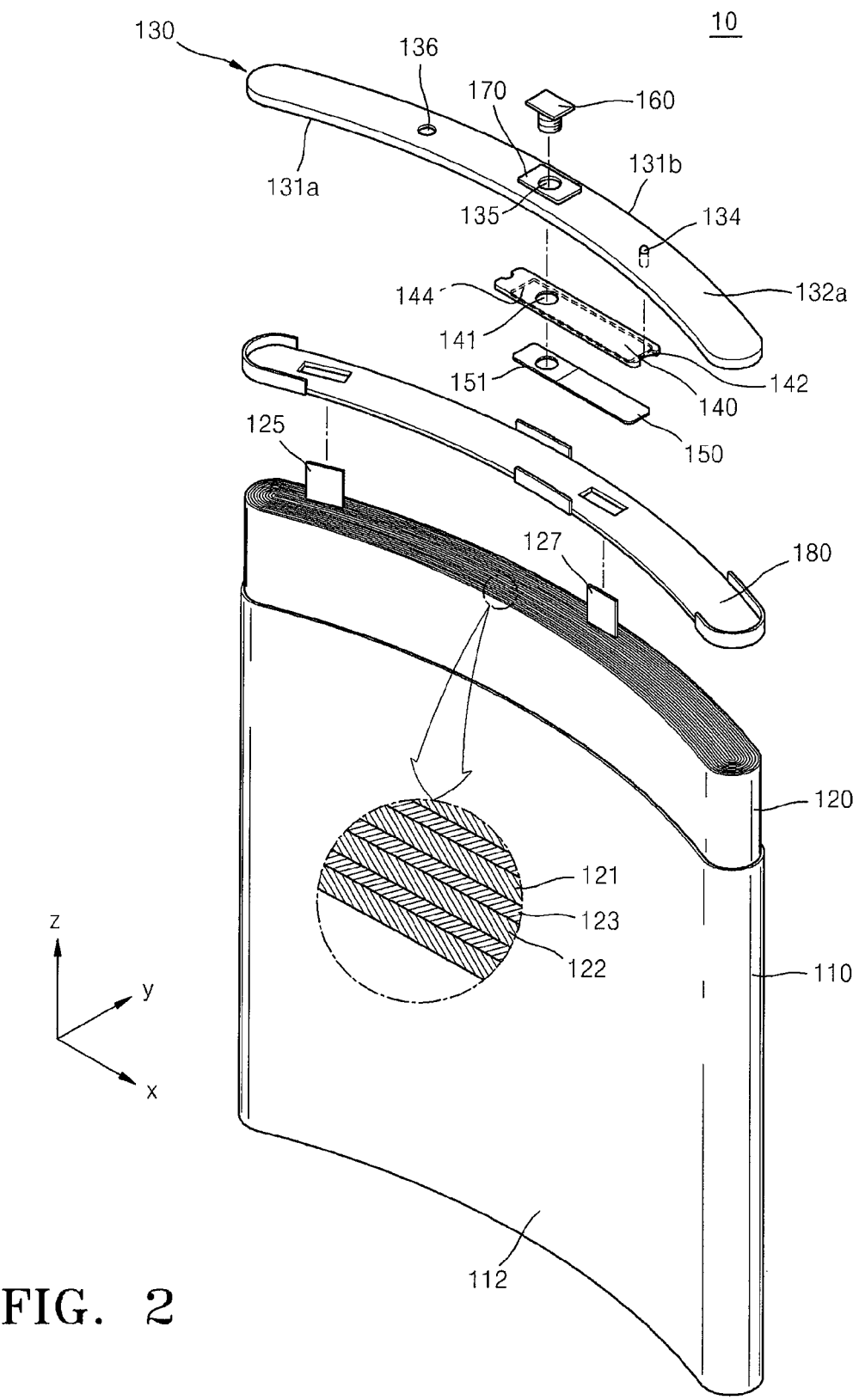
FIG. 2 is an exploded perspective view illustrating the secondary battery of FIG. 1.
Figure 3:
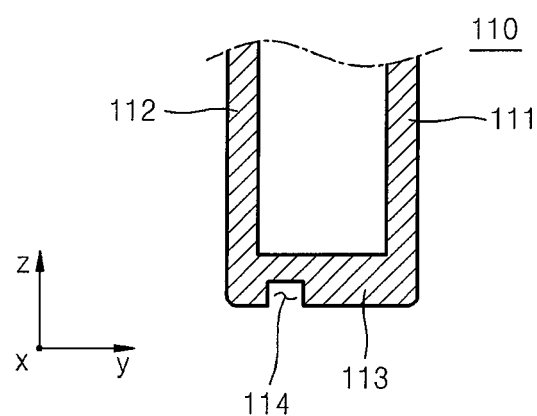
FIG. 3 is a cross-sectional view illustrating a portion of a can cut along the line A-A of FIG. 1.
Figure 4:
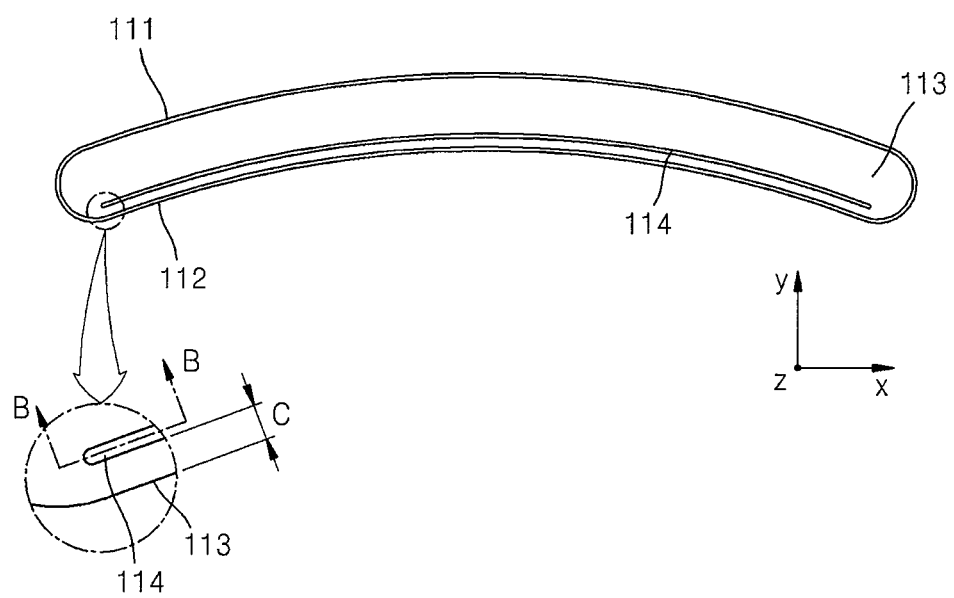
FIG. 4 is a bottom view illustrating a third surface of a can illustrated in FIG. 1 according to an embodiment of the present invention.
Figure 5:
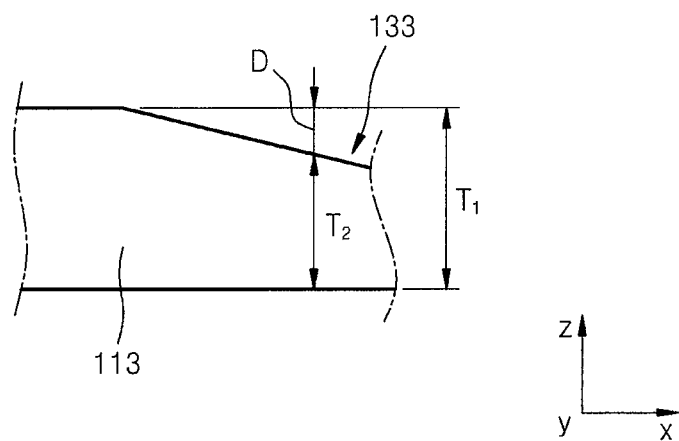
FIG. 5 is a cross-sectional view of a portion of the can cut along the line B-B of FIG. 4.

FIG. 1 is a perspective view illustrating a secondary battery 10 according to an embodiment of the present invention. FIG. 2 is an exploded perspective view illustrating the secondary battery 10 of FIG. 1. FIG. 3 is a cross-sectional view illustrating a portion of a can 110 cut along the line A-A of FIG. 1. FIG. 4 is a bottom view illustrating a third surface of the can 110 illustrated in FIG. 1 according to an embodiment of the present invention. FIG. 5 is a cross-sectional view of a portion of the can 110 cut along the line B-B of FIG. 4.

Referring to FIGS. 1 through 5, the secondary battery 10 may include the can 110 having an opening at one end, an electrode assembly 120 accommodated in the can 110, and a cap plate 130 coupled to the end of the can 110.

The opening is formed at the end of the can 110 so that the electrode assembly 120 may be inserted into the can 110. The opening is curved (e.g., with a predetermined curvature), and accordingly, the can 110 is also curved overall, thereby forming the curved external appearance of the secondary battery 10. The can 110 may be formed of aluminum or an aluminum alloy. Thus, the can 110 may protect the electrode assembly 120 from an external impact and function as a heat dissipation plate that emits, to the outside, heat that is generated during charging and discharging operations of the electrode assembly 120.

The can 110 described above may include a third surface 113 which is a bottom surface, a first surface 111 which is a lateral surface bent with the third surface 113, and a second surface 112 which is another lateral surface bent with the third surface 113 and disposed to face the first surface 111. Hence, the first and second surface are attached to the third surface at one end, and are substantially parallel to each other.

The first surface 111 may be convex, and the second surface 112 may be concave. In detail, the first surface 111 may be curved outwardly, and the second surface 112 may be curved inwardly. However, the present invention is not limited thereto as those skilled in the art would appreciate.

The secondary battery 10 may include a deformation inducing portion (not shown) formed on the third surface 113 which is a bottom surface of the can 110. The deformation inducing portion may be formed on the third surface 113 exposed to the outside or disposed inside the can 110. However, for convenience of description, the description will focus on an embodiment in which the deformation inducing portion is formed on the third surface 113 exposed to the outside.

The deformation inducing portion as described above may reduce a force needed for deformation of the can 110 or the third surface 113 when deforming the can 110 or curvedly forming the third surface 113. The deformation inducing portion may have various forms. For example, the deformation inducing portion may be formed of a material that is different from the other portions of the third surface 113. Also, the deformation inducing portion may include a deformation inducing groove 114 that is formed by indenting the third surface 113. However, the deformation inducing portion is not limited thereto, and may be formed of any suitable material and have any suitable structure whereby a force needed for deformation of the can 110 is reduced when deforming the can 110.

The deformation inducing groove 114 may be formed on the third surface 113. The deformation inducing groove 114 may be formed on the third surface 113 after forming the third surface 113, by using a punching process or applying a pressure.

The deformation inducing groove 114 may have a relatively small thickness compared to a thickness of the third surface 113, and thus, when an external force or pressure is applied to the secondary battery 10, deformation is induced first in the deformation inducing groove 114 so as to absorb the external force or pressure. Accordingly, an explosion or ignition of the secondary battery 10 due to an external impact or the like may be prevented, thereby improving stability of the secondary battery 10.

In detail, a second thickness T2 of a portion of the third surface 113 on which the deformation inducing groove 114 is formed may be different from a thickness T1 of a portion of the third surface 113 on which the deformation inducing groove 114 is not formed. For example, the second thickness T2 may be smaller than the first thickness T1. In detail, the second thickness T2 may be equal to or greater than 25% of the first thickness T1. When the second thickness T2 is less than 25% of the first thickness T1, an excessive force may be applied when curvedly forming the can 110, and the deformation inducing groove 114 may be destroyed, and contents of the can 110 may be leaked to the outside consequently.

The deformation inducing groove 114 may be elongated in a lengthwise direction of the third surface 113. For example, the deformation inducing groove 114 may be in the form of a slot or slit, and may be symmetrical with respect to a center of the third surface 113.

Also, a depth D of the deformation inducing groove 114 may vary along the lengthwise direction of the third surface 113. For example, the depth D of the deformation inducing groove 114 may gradually decrease from a center of the third surface 113 to two ends of the third surface 113. In particular, a depth of the deformation inducing groove 114 may be greater at a center portion than at two ends of the third surface 113. Here, a thickness of the third surface 113 on which the deformation inducing groove 114 is formed may be greater at the two ends of the third surface 113 than at the center portion of the third surface 113.

Meanwhile, the deformation inducing groove 114 may be closer to the second surface 112 than to the first surface 111. The secondary battery 10 is first flatly manufactured, and then is placed in a jig having a curvature (e.g., a predetermined curvature) and pressurized. Through pressurization, the second surface 112 of the can 110 is deformed to be concave and receives a contraction stress, and the first surface 111 is deformed to be convex and receives an expansion stress. When the deformation inducing groove 114 is closer to the second surface 112 than to the first surface 111, the contraction stress applied to the second surface 112 due to deformation of the deformation inducing groove 114 is mitigated, and thus, the secondary battery 110 may be manufactured using a relatively small force. Thus, a manufacturing efficiency of the secondary battery 10 may be improved.

The deformation inducing groove 114 may be spaced apart from the second surface 112 by about 0.25 mm to about 0.5 mm. If a distance C between the deformation inducing groove 114 and the second surface 112 is less than 0.25 mm, space between the deformation inducing groove 114 and the second surface 112 is reduced to decrease a mechanical strength of the can 110 when bending the second surface 112. On the other hand, if the distance C between the deformation inducing groove 114 and the second surface 112 is greater than 0.5 mm, a greater force may be consumed when bending the can 110.

Also, the depth D of the deformation inducing groove 114 may be from about ⅓ to about ½ of the first thickness T1 of the third surface 113. If the depth D of the deformation inducing groove 114 is less than ⅓ of the first thickness T1 of the third surface 113, a deformation inducing effect due to the deformation inducing groove 114 may be small when an external force or pressure is present or when the secondary battery 10 is manufactured. On the other hand, if the depth D of the deformation inducing groove 114 is greater than ½ of the first thickness T1 of the third surface 113, a strength of the can 110 may decrease so as to deform the can 110.

The electrode assembly 120 may include a first electrode plate 121, a second electrode plate 122, and a separator 123 interposed between the first electrode plate 121 and the second electrode plate 122. The electrode assembly 120 may be manufactured by sequentially stacking the first electrode plate 121, the separator 123, and the second electrode plate 122 and winding these in a jelly-roll form. Alternatively, the electrode assembly 120 may be formed by sequentially stacking the first electrode plate 121, the separator 123, and the second electrode plate 122.

The first electrode plate 121 may be a positive electrode film or a negative electrode film. When the first electrode plate 121 is a positive electrode film, the second electrode plate 122 may be a negative electrode film. In contrast, when the first electrode plate 121 is a negative film, the second electrode plate 122 may be a positive electrode film. That is, the first electrode plate 121 and the second electrode plate 122 have electrically different polarities and are not limited to a predetermined polarity. However, for convenience of description, example embodiments will be described primarily in reference to the first electrode plate 121 being formed of a positive electrode film and the second electrode plate 122 formed of a negative electrode film.

The first electrode plate 121 may include a first active material portion coated (e.g., a first coated portion) with a first active material and a first non-coated portion which is not coated with the first active material. The first active material portion is formed by coating, for example, a portion of at least a surface of an aluminum plate with a first active material, and the rest of the portion of the aluminum plate that is not coated with the first active material may be the first non-coated portion. The first active material may be positive active materials such as a lithium-containing transition metal oxide, e.g., $LiCoO_2$, $LiNiO_2$, $LiMnO_2$, or $LiMnO_4$, or a lithium chalcogenide compound.

The second electrode plate 122 may include a second active material portion (e.g., a second coated portion) coated with a second active material and a second non-coated portion which is not coated with the second active material. The second active material portion is formed by coating, for example, a portion of at least a surface of a copper plate with the second active material, and the rest of the portion of the copper plate that is not coated with the second active material may be the second non-coated portion. The second active material may be, for example, a negative electrode active material. For example, the second active material may be a carbon material such as crystalline carbon, amorphous carbon, a carbon complex, or carbon fibers, or a lithium metal or a lithium alloy.

The separator 123 may be a porous polymer layer such as polyethylene film or a polypropylene film, may be in the form of a woven or nonwoven fiber including polymer fibers, may include ceramic particles, or may be formed of a polymer solid electrolyte. The separator 123 may be formed of an independent film or a nonconductive, porous layer formed on the first electrode plate 121 or the second electrode plate 122. The separator 123 is formed to electrically separate the first electrode plate 121 and the second electrode plate 122 from each other, and the form of the separator 123 may not necessarily be the same as the form of the first electrode plate 121 and/or the second electrode plate 122.

A first electrode tab 125 and a second electrode tab 127 are included to electrically couple (e.g., electrically connect) the electrode assembly 120 to the outside, and to this end, the first electrode tab 125 is electrically coupled (e.g., electrically connected) to the first electrode plate 121, and the second electrode tab 127 may be electrically coupled (e.g., electrically connected) to the second electrode plate 122. In detail, the first electrode tab 125 may be connected to the first non-coated portion via welding or the like, and the second electrode tab 127 may be coupled (e.g., electrically connected) to the second non-coated portion via welding or the like.

The cap plate 130 may seal the opening of the can 110. Like the can 110, the cap plate 130 may be formed of a metallic material such as aluminum or an aluminum alloy. The cap plate 130 and the can 110 may be bonded to each other by laser welding or the like.

As the opening of the can 110 is curved (e.g., with a predetermined curvature), and the cap plate 130 seals the opening, the cap plate 130 may also have a curvature (e.g., a predetermined curvature). In detail, the cap plate 130 may have a first lateral surface 131a, which is concave, and a second lateral surface 131b, which is convex, and the first and second lateral surfaces 131a and 131b may be parallel to each other. The first lateral surface 131a and the second lateral surface 131b may have substantially the same (e.g., the same) curvature as the opening of the can 110.

Also, the cap plate 130 may include a first plate surface 132a and a second plate surface (not shown) that are flat and connect the first lateral surface 131a and the second lateral surface 131b. The first plate surface 132a may be outwardly directed (e.g., may face away from the opening of the can), and the second plate surface may be directed toward (e.g., may face the opening of the can), the electrode assembly 120.

The cap plate 130 may include an electrolyte inlet 136. After the cap plate 130 is coupled to the can 110, an electrolyte is injected into the can 110 through the electrolyte inlet 136, and when injection of the electrolyte is completed, the electrolyte inlet 136 may be hermetically sealed.

An insulation plate 140 and a terminal plate 150 may be positioned below the cap plate 130. The insulation plate 140 may be formed of an insulation material so as to prevent a short circuit between the terminal plate 150 and the cap plate 130.

The cap plate 130 may include an anchor 134 protruding from the second plate surface towards the electrode assembly 120, and an anchor groove 142 into which the anchor 134 is inserted may be formed at a lateral end portion of the insulation plate 140. The anchor groove 142 may be coupled (e.g., connected) to the anchor 134 to thereby prevent distortion of a position of the insulation plate 140.

Also, the cap plate 130 may further include a coupling tip (not shown) protruding from the second plate surface toward the electrode assembly 120, and the insulation plate 140 may further include a coupling groove (not shown) at a position corresponding to the coupling tip.

The terminal plate 150 is mounted in a mounting groove 144 formed in the insulation plate 140. The terminal plate 150 may be formed of a nickel (Ni) alloy, and a lateral end portion of the terminal plate 150 may be electrically coupled (e.g., electrically connected) to the second electrode tab 127.

An electrode pin 160 may be located on the first plate surface 132a of the cap plate 130. The electrode pin 160 may be inserted into terminal through-holes 135, 141, and 151 respectively formed in the cap plate 130, the insulation plate 140, and the terminal plate 150 to contact the terminal plate 150. As the terminal plate 150 contacts the second electrode tab 127 of the electrode assembly 120, the electrode pin 160 may be electrically coupled (e.g., electrically connected) to the second electrode plate 122. The first electrode tab 125 may be electrically coupled (e.g., electrically connected) to the cap plate 130.

A gasket 170 may be formed of an insulating material like the insulation plate 140 to thereby insulate the electrode pin 160 and the cap plate 130 from each other.

Accordingly, the secondary battery 10 having a desired curvature may be manufactured with a relatively small force when deforming the can 110 by using the deformation inducing portion 114. Moreover, if an force or pressure is applied to a portion of the secondary battery 10, a portion of the force or pressure is absorbed by the deformation inducing portion 114, thereby securing stability of the secondary battery 10.

Figure 6:
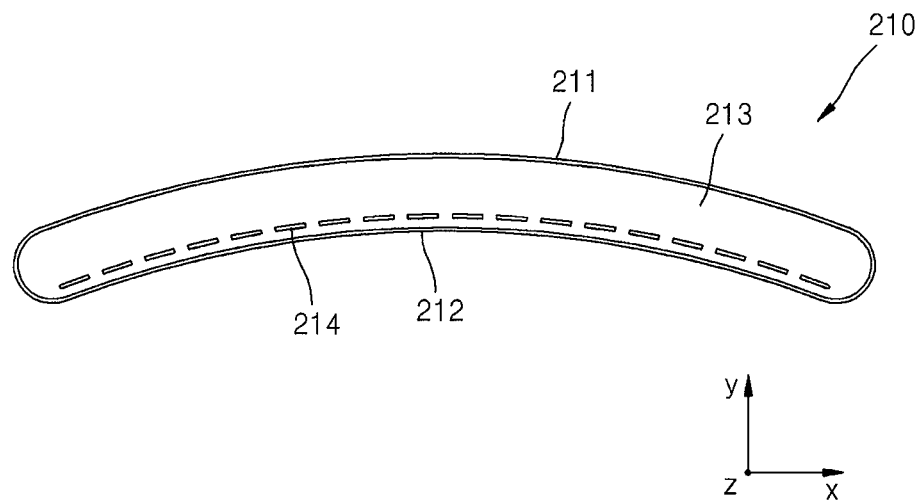
FIG. 6 is a bottom view illustrating a third surface of the can illustrated in FIG. 1 according to another embodiment of the present invention.

FIG. 6 is a bottom view illustrating a third surface 213 of a can 210 according to another embodiment of the present invention.

Referring to FIG. 6, the can 210 may have a first surface 211 that is convex and a second surface 212 that is concave, and a third surface 213 that is flat and couples (e.g., connects) the first surface 211 and the second surface 212. The first surface 211 and the second surface 212 may be parallel to each other. The first surface 211, the second surface 212, and the third surface 213 are the same or similar as their corresponding elements described above, and thus, detailed description thereof will be omitted.

A deformation inducing portion (not shown) may be formed on the third surface 213 along a lengthwise direction. The deformation inducing portion according to the current embodiment of the present invention is the same or similar as the deformation inducing portion illustrated in and described with reference to FIGS. 1 through 5. That is, the deformation inducing portion includes a deformation inducing groove 214, and the deformation inducing groove 214 may have the same or similar curvature as the first surface 211 and the second surface 212, and may be closer to the second surface 212 than to the first surface 211. The position, size, and depth of the deformation inducing groove 214 are the same as or similar to those described above with reference to FIGS. 1 through 5, and thus, a detailed description thereof will be omitted.

Meanwhile, the deformation inducing portion 214 may be discontinuously formed. That is, the deformation inducing groove 214 may have portions having the same or similar thickness as the third surface 213, and thus, the entire strength of the third surface 213 may be improved, thereby stably manufacturing the secondary battery 10. Also, the portions of the deformation inducing portion 214 allow the third surface 213 to stably withstand up to a reference external pressure so that the third surface 213 is deformed only when the reference external pressure is exceeded.

Figure 7:
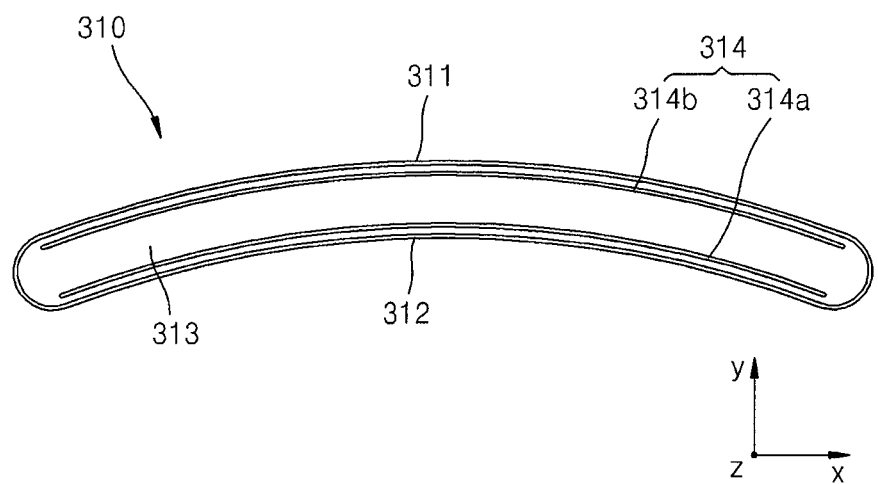
FIG. 7 is a bottom view illustrating a third surface of the can illustrated in FIG. 1 according to another embodiment of the present invention.

FIG. 7 is a bottom view illustrating a third surface 313 of a can 310 according to another embodiment of the present invention.

Referring to FIG. 7, the can 310 may have a first surface 311 that is convex and a second surface 312 that is concave, and a third surface 313 that is flat and connects the first surface 311 and the second surface 312, and the first surface 311 and the second surface 312 maybe parallel to each other. The first surface 311, the second surface 312, and the third surface 313 are the same or similar as their corresponding elements described above, and thus, a detailed description thereof will be omitted.

A deformation inducing portion (not shown) may be formed on the third surface 313 along a lengthwise direction. The deformation inducing portion according to the current embodiment of the present invention is the same or similar as the deformation inducing portion illustrated in and described with reference to FIGS. 1 through 5. That is, the deformation inducing portion includes a deformation inducing groove 314, and the deformation inducing groove 314 may have the same or similar curvature as the first surface 211 and the second surface 212.

The deformation inducing groove 314 may include a first deformation groove 314a that is formed relatively close to the second surface 312 and a second deformation inducing groove 314b may also be formed on the third surface 313 to face the first deformation groove 314a. The first deformation inducing groove 314a and the second deformation inducing groove 314b may have a similar form as each other.

In detail, the first deformation inducing groove 314a may be the same as the deformation inducing groove 114 that is illustrated in and described above with reference to FIGS. 1 through 5. That is, as the first deformation groove 314a is included, stability of the secondary battery 10 (see FIG. 1) may be improved, and the can 110 (see FIG. 1) may be easily deformed.

The second deformation inducing groove 314b may be closer to the first surface 311 than to the second surface 312. For example, the second deformation inducing groove 314b may be spaced apart from the first surface 311 by about 0.25 mm to about 0.5 mm. Also, similar to the first deformation inducing groove 314a, the second deformation groove 314b may have a depth corresponding to about ⅓ to about ½ of a thickness of the third surface 313.

As the second deformation inducing groove 314b is further formed, when an external force or pressure is applied to the secondary battery 10 (see FIG. 1), deformation of the second deformation inducing groove 334 is induced in addition to the first deformation inducing groove 314a. Accordingly, stability of the secondary battery 10 (see FIG. 1) may be further improved. Also, when forming a bent form by applying a pressure to the can 310, a stress generated in the can 310 may be further effectively distributed.

According to the embodiments of the present invention, a manufacturing efficiency of secondary batteries may be improved.

It should be understood that the example embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims, and their equivalents.

What is claimed is:

1. A secondary battery comprising:
   a can having an opening at one end; and
   an electrode assembly in the can,
   wherein the can comprises:
      a bottom surface which is curved; and
      a deformation inducing portion at the bottom surface to reduce a force needed for deformation when bending the bottom surface,
   wherein the deformation inducing portion is elongated along a lengthwise direction of the bottom surface,
   wherein the deformation inducing portion is curved, and
   wherein a depth of the deformation inducing portion gradually decreases from a center of the bottom surface to the two ends of the bottom surface along a longest direction of the deformation inducing portion.

2. The secondary battery of claim 1, wherein the can comprises:
   a first surface attached to the bottom surface, the first surface being convex and connected to the bottom surface; and
   a second surface attached to the bottom surface, the second surface being concave and facing the first surface.

3. The secondary battery of claim 2, wherein a distance from the deformation inducing portion to the first surface is greater than a distance from the deformation inducing portion to the second surface.

4. The secondary battery of claim 1, wherein the deformation inducing portion is formed by indenting a portion of the bottom surface.

5. The secondary battery of claim 4, wherein the deformation inducing portion is at the bottom surface exposed to the outside of the can.

6. The secondary battery of claim 1, wherein a first thickness of a portion of the bottom surface on which the deformation inducing portion is formed is different from a second thickness of a portion of the bottom surface on which the deformation inducing portion is not formed.

7. The secondary battery of claim 6, wherein the first thickness is equal to or greater than 25% of the second thickness.

8. The secondary battery of claim 1, wherein the deformation inducing portion is symmetrical with respect to a center of the bottom surface.

9. The secondary battery of claim 1, wherein the deformation inducing portion is discontinuously formed.

10. A secondary battery comprising:
    a can that has an opening at one end and is curved;
    an electrode assembly in the can;
    a cap plate sealing the opening; and
    a deformation inducing portion that is an indentation on a bottom surface of the can,
    wherein the deformation inducing portion is elongated along a lengthwise direction of the bottom surface,
    wherein the deformation inducing portion is curved, and
    wherein a depth of the deformation inducing portion gradually decreases from a center of the bottom surface to the two ends of the bottom surface along a longest direction of the deformation inducing portion.

11. The secondary battery of claim 10, wherein the deformation inducing portion reduces a force necessary to cause deformation when bending the can.

12. The secondary battery of claim 11, wherein the deformation inducing portion is formed by indenting the bottom surface of the can inside the can.

13. The secondary battery of claim 12, wherein a thickness of the bottom surface on which the deformation inducing portion is formed is different in a center portion and in other portions of the can.

14. The secondary battery of claim 10, wherein the deformation inducing portion is discontinuous.

15. The secondary battery of claim 10,
    wherein the can comprises surfaces attached to the bottom surface to face each other and are either concave or convex, wherein one of the surfaces is concave and the other is convex,
    wherein the deformation inducing portion is on the bottom surface closer to the concave surface than to the convex surface.

* * * * *